(12) United States Patent
Södergard et al.

(10) Patent No.: US 7,544,746 B2
(45) Date of Patent: Jun. 9, 2009

(54) HYPERBRANCHED POLYMERS

(75) Inventors: Niels Dan Anders Södergard, Turku (FI); Erik Mikael Stolt, Turku (FI)

(73) Assignee: Tate & Lyle Public Limited Company, London (GB)

( * ) Notice: Subject to any disclaimer, the term of this patent is extended or adjusted under 35 U.S.C. 154(b) by 768 days.

(21) Appl. No.: 10/516,055

(22) PCT Filed: May 30, 2003

(86) PCT No.: PCT/EP03/05785

§ 371 (c)(1),
(2), (4) Date: Jun. 27, 2005

(87) PCT Pub. No.: WO03/099910

PCT Pub. Date: Dec. 4, 2003

(65) Prior Publication Data

US 2008/0221265 A1 Sep. 11, 2008

(30) Foreign Application Priority Data

May 29, 2002 (EP) .................................. 02077106

(51) Int. Cl.
*C08L 77/06* (2006.01)
(52) U.S. Cl. .................. 525/437; 525/450; 528/272; 528/274; 528/296; 528/297; 528/302; 528/306; 528/308; 528/335; 528/421
(58) Field of Classification Search ................. 525/437, 525/450; 528/272, 274, 296, 297, 302, 306, 528/308, 335, 421
See application file for complete search history.

(56) References Cited

U.S. PATENT DOCUMENTS

| | | | |
|---|---|---|---|
| 5,310,865 A * | 5/1994 | Enomoto et al. ............ 528/361 | |
| 5,434,241 A | 7/1995 | Kim et al. | |
| 5,470,944 A * | 11/1995 | Bonsignore .................. 528/354 | |
| 5,834,118 A * | 11/1998 | Rånby et al. ................. 428/482 | |
| 6,569,956 B1 * | 5/2003 | Ramesh ....................... 525/437 | |
| 6,713,530 B2 * | 3/2004 | Wang et al. .................. 523/160 | |
| 2002/0002242 A1 | 1/2002 | McNamara et al. | |
| 2004/0192857 A1 | 9/2004 | Borer et al. .................. 525/418 | |
| 2005/0054812 A1 * | 3/2005 | Wagner et al. ............... 528/272 | |

FOREIGN PATENT DOCUMENTS

| | | |
|---|---|---|
| DE | 196 17 137 | 2/1997 |
| DE | 101 36 911 | 2/2003 |
| EP | 0 572 675 | 12/1993 |
| EP | 0 573 024 | 12/1993 |
| EP | 0 632 081 | 1/1995 |
| EP | 0 710 684 | 5/1996 |
| EP | 0 761 712 A2 | 3/1997 |
| EP | 0 829 503 | 4/1998 |
| EP | 1 116 714 | 7/2001 |
| EP | 1 162 221 | 12/2001 |
| EP | 1 273 633 | 1/2003 |
| EP | 1 295 918 | 3/2003 |
| EP | 1 295 919 | 3/2003 |
| EP | 1 300 434 | 4/2003 |
| EP | 1 300 439 | 4/2003 |
| EP | 1 338 610 | 8/2003 |
| EP | 1 582 548 | 10/2005 |
| FR | 2 850 659 | 8/2004 |
| WO | WO92/08749 | 5/1992 |
| WO | WO93/18079 | 9/1993 |
| WO | WO96/07688 | 3/1996 |
| WO | WO96/12754 | 5/1996 |
| WO | WO96/14345 | 5/1996 |
| WO | WO96/14346 | 5/1996 |
| WO | WO97/45474 | 12/1997 |
| WO | WO97/49781 | 12/1997 |
| WO | WO99/00440 | 1/1999 |
| WO | WO99/07754 | 2/1999 |
| WO | WO00/59982 | 10/2000 |
| WO | WO00/77070 | 12/2000 |
| WO | WO01/12725 | 2/2001 |
| WO | WO01/46296 | 6/2001 |
| WO | WO02/10298 | 2/2002 |
| WO | WO02/32982 | 4/2002 |
| WO | WO02/36697 | 5/2002 |
| WO | WO02/068499 | 9/2002 |

(Continued)

*Primary Examiner*—Ling-Siu Choi
(74) *Attorney, Agent, or Firm*—Williams, Morgan & Amerson, P.C.

(57) ABSTRACT

A process for preparing a hyperbranched polymer having a weight-average molar mass of at least 30,000, includes coupling a first prepolymer having at least three functional end groups with a second prepolymer having at least two functional end groups by a dehydration condensation reaction between the end groups in the prepolymers. The number of arms and/or molar mass of the functionalized prepolymers can accurately be adjusted, thus affecting the properties of the resulting hyperbranched polymer in a desired way. The polymer can be equipped e.g. with hydrophobic and hydrophilic parts. Also, the number of functional end groups, that optionally can be used for further chemical reactions, in the hyperbranched polymer can easily be adjusted to a desired level. The hyperbranched high molar mass polymer can be prepared in high yields without the use of organic solvents or linking compounds, which is advantageous from an environmental as well as an economical point of view.

21 Claims, 4 Drawing Sheets

FOREIGN PATENT DOCUMENTS

| | | |
|---|---|---|
| WO | WO02/092668 | 11/2002 |
| WO | WO03/013379 | 2/2003 |
| WO | WO03/023876 | 3/2003 |
| WO | WO03/054204 | 7/2003 |
| WO | WO03/093002 | 11/2003 |
| WO | WO03/093343 | 11/2003 |
| WO | WO03/099910 | 12/2003 |
| WO | WO2004/020503 | 3/2004 |
| WO | WO2004/078809 | 9/2004 |
| WO | WO2004/090011 | 10/2004 |
| WO | WO2004/108654 | 12/2004 |
| WO | WO2005/037893 | 4/2005 |
| WO | WO2005/052009 | 6/2005 |
| WO | WO2005/054333 | 6/2005 |
| WO | WO2005/060444 | 7/2005 |

* cited by examiner

HYPERBRANCHED POLYMERS

TECHNICAL FIELD OF THE INVENTION

The invention relates to a process for preparing a hyperbranched polymer, in particular hyperbranched biodegradable and/or hydrolysable polymers having a weight-average molar mass of at least 30,000 and to processes of producing these.

DESCRIPTION OF RELATED ART

The term "hyperbranched" is known in the specialist field; herein, the said term intends to encompass polymers having one or more central atom(s) as branching points to which two or more polymer chains built up by respective repeating monomer units, i.e. arms are attached. These arms contain additional branching points, offering the possibility for further branching and/or cross-linking upon continued polymerisation.

It is generally known that the preparation of a high molar mass polymers, in particular poly(hydroxycarboxylic acid), such as for example poly(lactic acid), by a direct dehydration condensation reaction is not feasible. Due to the equilibrium between the species in the reaction mixture a low molar mass polymer, often showing substandard mechanical properties for many applications, is obtained. Commercial interest for solving this problem has increased because of environmental awareness and several approaches to prepare a polymer, such as a poly(hydroxycarboxylic acid), of high enough molar mass have been described.

EP-A-0 572 675 describes a process for making degradable high molar mass poly(hydroxycarboxylic acid) polymers through a dehydration condensation reaction. EP-A-0 710 684 describes a process for preparing poly(hydroxy acid) polymers by a dehydration condensation reaction and further reacting the poly(hydroxy acid) with a linking molecule from the group consisting of polyisocyanate compounds, polybasic acid anhydrides, cyclic imino esters, cyclic imino ethers, aromatic hydroxycarboxylic acids, polyamino compounds, polyhydric alcohols, epoxy compounds, polyfunctional aziridine compounds, lactames, lactones, or diethylene glycol bischloroformates. The processes disclosed, however, require the use of at least one organic solvent thus having a negative impact from the environmental point of view. Furthermore, the solvent has to be dried from water produced in the dehydration condensation reaction in another reaction step, for example by using drying agents, in order to have the desired effect of removing water in an efficient way from the reaction medium. Alternatively fresh, dry organic solvent can be added during the reaction, which is extremely undesired from an environmental as well as economical point of view. Another disadvantage when using organic solvents in the dehydration condensation reaction is that the prepared polymer has to be collected from the solvent, typically by using a non-solvent for the polymer, and dried. These steps cause excess labor, are time consuming, and usually lower the yield of the raw material used, further reducing the industrial and environmental advantages.

U.S. Pat. No. 5,434,241 describes a process for making poly(lactic acid) comprising polycondensation of lactic acid in the presence of a polyhydroxyl compound having at least four hydroxyl groups, yielding a polymer defined as star-shaped. The poly(lactic acid) obtained has a higher molar mass than a polymer prepared by conventional dehydration methods, but these known processes are characterized by a clear limit in obtainable molar mass. If the polyhydroxyl compound is used in large amounts, the polymer will be hydroxyl-terminated and the dehydration condensation reaction cannot continue thus yielding a low molar mass polymer. On the other hand, if the polyhydroxyl compound is used in extremely small amounts, the effect of the polyhydroxyl compound will diminish and the polycondensation reaction will resemble one without any polyhydroxyl compound present, resulting in that a high molar mass polymer is not achievable any more.

EP-A-0 792 901 discloses linear aliphatic polyester copolymers with high enough molar mass for practical use prepared by dehydration condensation of an aliphatic dicarboxylic acid and an aliphatic diol in the presence of an aliphatic monohydroxycarboxylic acid.

U.S. Pat. No. 5,470,944 discloses the preparation of degradable high molar mass poly(lactic acid) copolymers by linking low molar mass telechelic poly(lactic acid) polymers using diisocyanates, bis-epoxides, bis-oxazolines, or bis-ortho esters.

EP-A-0 829 503 discloses a degradable polymer and a process for making the degradable polymer in yields below 90%, comprising a hydroxycarboxylic acid (A), a polyfunctional central compound being a carboxylic acid and/or anhydride of the same with three or more functional groups or a hydroxyl-containing compound with three or more hydroxyl groups (B), and a polyfunctional compound of two or more functional groups (C), prepared through a dehydration condensation reaction. In preferred embodiments organic solvent is used in at least some stage of the preparation, which, as earlier described herein, has several negative consequences both in an environmental as well as in an economical point of view. Furthermore, according to EP-A-0 829 503 all compounds, i.e., A, B, and C, are preferably added at the same time, thus giving an uncontrollable reaction, even though a high molar mass polymer is achievable. Other embodiments are also described, though being without the possibility of any accurate control of the chemistry.

SUMMARY OF THE INVENTION

The present inventors, however, surprisingly found that hyperbranched high molar mass polymers can be prepared in an improved way by a dehydration condensation reaction in high yields, with an enhanced control of the chemistry in the obtained polymer by using certain central functional compounds. Polymers having a high molar mass are defined herein as polymers having a weight-average molar mass of at least 30,000 g/mol, more preferably at least 50,000 g/mol. The upper limit of the weight average molar mass is not limited, but is preferably at most 1,000,000. The process according to the present invention comprises coupling a first prepolymer having at least three functional end groups with a second prepolymer having at least two functional end groups by a dehydration condensation reaction between the end groups in the prepolymers.

The improvements are for instance:

1. The number of arms and/or molar mass of the functionalized prepolymers can accurately be adjusted by the choice of and/or amount of central initiating compound, thus affecting the properties of the resulting hyperbranched polymer, in particular poly(hydroxycarboxylic acid) in a desired way.

2. Hyperbranched copolymers, e.g. block- or random-copolymers, can be prepared in a controlled and accurate manner, which can be used for, for example, equipping the polymer with hydrophobic and hydrophilic parts.

3. The number of functional end groups, that optionally can be used for further chemical reactions, in the hyperbranched polymer can easily be adjusted to a desired level.

4. The hyperbranched high molar mass polymer can be prepared in high yields without the use of organic solvents or linking compounds, which is advantageous from an environmental as well as an economical point of view.

BRIEF DESCRIPTION OF THE DRAWINGS

The invention will now be further explained by the following non-limiting figures, wherein.

DETAILED DESCRIPTION OF PREFERRED EMBODIMENTS

Figure 1:
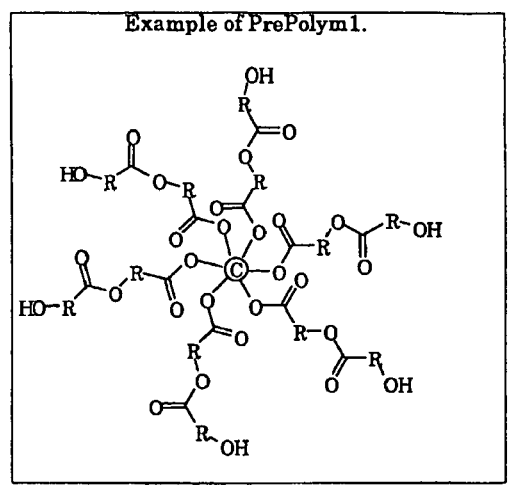
In FIG. 1 a schematic representation is given of examples of the prepolymers used in the present invention, i.e. PrePolym1 and PrePolym2. For the sake of clarity only two repeating units per arm have been depicted in the star-shaped prepolymer.
Figure 1:
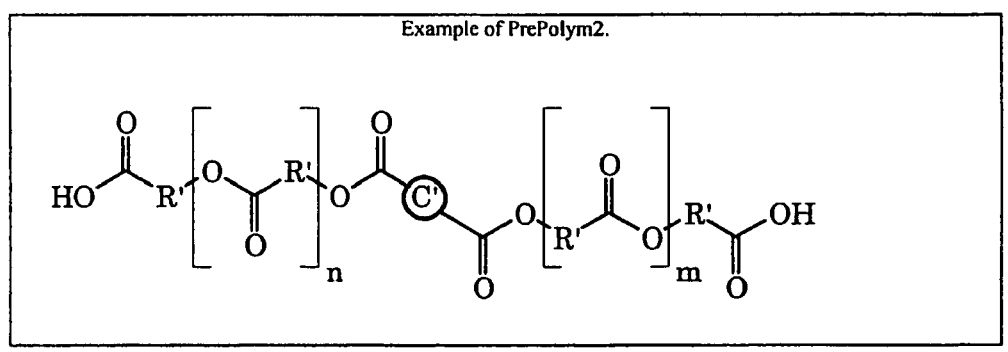
Figure 2:
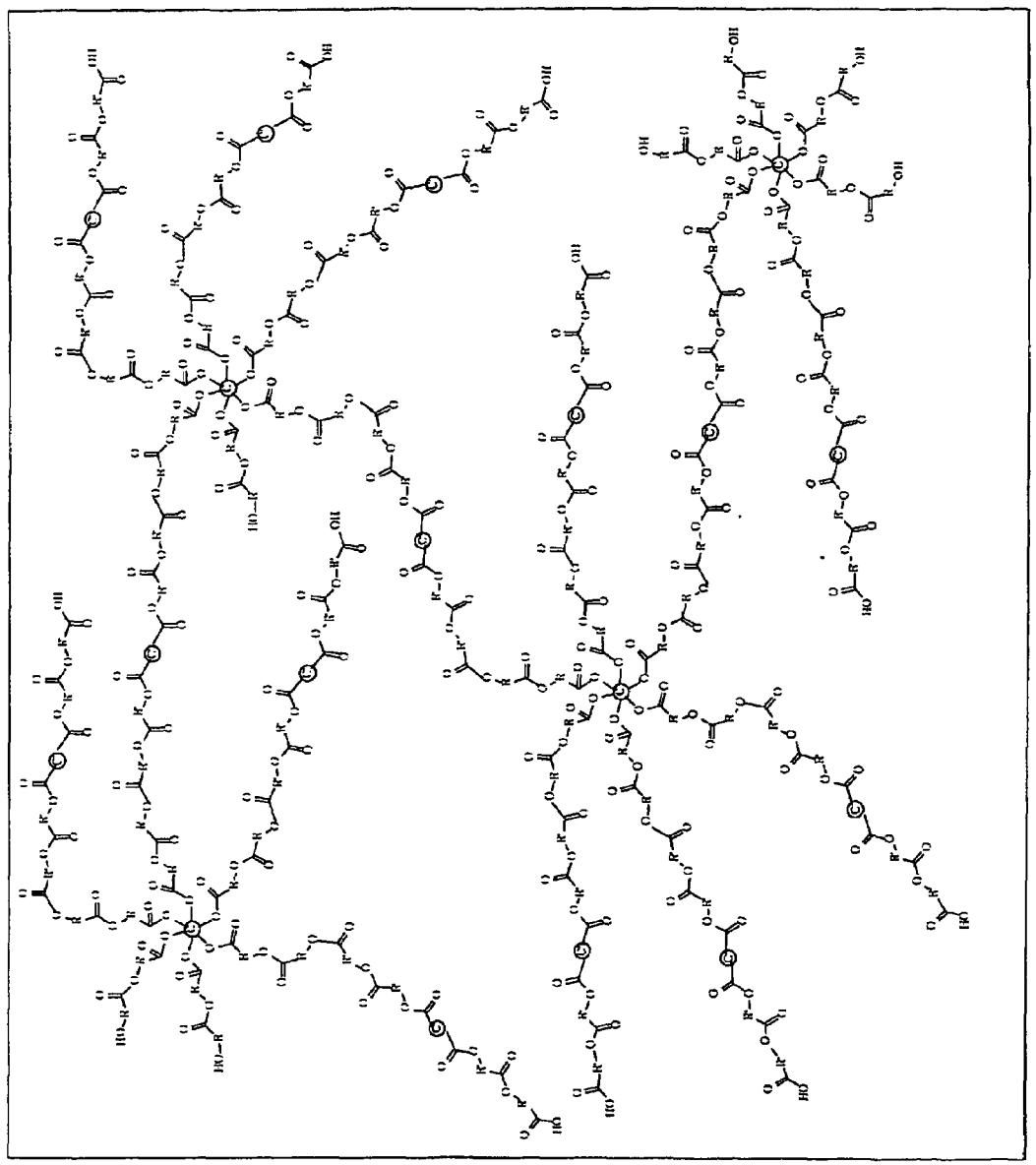
FIG. 2 is a schematic representation of a hyperbranched poly(hydroxycarboxylic acid) prepared by dehydration condensation of said prepolymers according to the present invention. For the sake of clarity only a few repeating units have been depicted in the hyperbranched poly(hydroxycarboxylic acid). The central functional compounds (C and C' in FIGS. 1 and 2) represent compounds containing the reactive groups as specified in the different embodiments of the invention. R and R' in FIGS. 1 and 2 represent the aliphatic groups within the repeating unit of the polymer, thus giving the repeating unit of the poly(hydroxycarboxylic acid) from the respective monomeric unit as specified in this invention. R and R' may or may not represent the same aliphatic group. n and m in FIG. 1 represents the number of repeating units in the prepolymer, and may or may not be the same integer.

It has been found that with the process according to the present invention, biodegradable and/or hydrolysable polymers can be prepared, in particular poly(hydroxycarboxylic) acid, such as poly(lactic)acid. From an environmental point of view, biodegradable and/or hydrolysable polymers are advantageous, as such polymers do not contribute to environmental pollution and can also be used in biological systems, e.g. in medical devices.

The dehydration condensation reaction is preferably performed in the melt at a temperature high enough to remove produced water from the reaction medium. The reaction temperature is though preferably kept below 250° C., and more preferably below 230° C., in order to avoid thermal degradation and/or other side-reactions from taking place during the dehydration condensation. Usually a reduced pressure and/or gas assist of inert gas is applied to remove the water in a more efficient way. No particular restriction is, however, set on how the dehydration condensation process is performed in the present invention.

In general, a proper amount of a catalyst known in the art is used in the dehydration condensation reaction and no specific limitation is set to which catalyst or combination of catalysts, nor when the catalyst is added, is used in the present invention. Representative catalysts include inorganic and organic compounds of metals such as, for example, Sn, Zn, Fe, Al, and so forth, acids, such as, for example, triflic acid, p-toluenesulphonic acid and so forth. The amount of catalyst is not in any particular way restricted, as long as the catalyst fulfills its initial purpose of increasing the reaction rate. Typically 0.001 to 1 wt %, and more typically 0.01 to 1 wt %, catalyst based on the amount of reagents is added, either in the beginning of, or during the dehydration condensation reaction.

The process according to the invention enables the preparation of high molar mass polymers without the need for an organic solvent due to the viscosity properties of the reaction mixture. However, if desired, such a solvent can be used, such as alcohols, esters, ethers, hydrocarbon or halogenated solvents. Preferably, said first and/or said second prepolymer is a poly(hydroxycarboxylic acid) has a weight-average molar mass of at least 500, and preferably at most 50,000, most preferably at most 500,000.

The functional end groups of said first and/or said second prepolymers are selected independently from functional groups able to undergo condensation reactions, for instance prepolymers with terminal hydroxy, carboxylic, cyano, amide, epoxy, and/or anhydride groups.

The functional end groups of said first and/or said second prepolymer are preferably selected independently from hydroxy or carboxylic groups.

Thus, according to a preferred embodiment of the invention a biodegradable and/or hydrolysable polymer is provided comprising a poly(hydroxycarboxylic acid) prepolymer (PrePolym1) containing three or more functional end groups of, for example, carboxylic acids or hydroxyl groups, a poly(hydroxycarboxylic acid) prepolymer (PrePolym2) containing two or more functional end groups of, for example, carboxylic acids or hydroxyl groups, and a dehydration condensation reaction of said prepolymers (PrePolym1 and PrePolym2), thus yielding the hyperbranched high molar mass poly(hydroxycarboxylic acid) of the invention.

According to present invention any carboxylic acid known in the art containing three or more reactive carboxylic acid groups can be used for the preparation of a carboxylic acid-terminated prepolymer (PrePolym1), including carboxylic acids such as, for example, 1,3,5-trimethyl-1,3,5-cyclohexanetricarboxylic acid, 1,2,3-propanetricarboxylic acid, 1,2,3,4-cyclopentanetetracarboxylic acid, 1,2,4,5-benzenetetracarboxylic acid, 1,2,3,4-butanetetracarboxylic acid, and 1,2,3,4,5,6-cyclohexanehexacarboxylic acid.

According to present invention any alcohol known in the art containing three or more reactive hydroxyl groups may be used for the preparation of a star-shaped hydroxyl-terminated prepolymer (PrePolym1), including alcohols such as, for example, trimethylolethane, trimethylolpropane, butanetriol, phloroglucinol, erythritol, pentaerythritol, or dipentaerythritol. Naturally occurring alcoholic compounds of sugars of mono-, di-, or trisaccharides of hexoses or pentoses, or maltitol, sorbitol, mannitol, xylitol, inositol, or such, can optionally be used.

According to present invention any carboxylic acid known in the art containing two or more reactive carboxylic acid groups may be used for the preparation of the linear or star-shaped carboxylic acid-terminated prepolymer (PrePolym2), including carboxylic acids such as, for example, oxalic acid, malonic acid, succinic acid, glutaric acid, 2,2-dimethyl glutaric acid, adipic acid, pimelic acid, suberic acid, azelaic acid, 1,3,5-trimethyl-1,3,5-cyclohexanetricarboxylic acid, 1,2,3-propanetricarboxylic acid, 1,2,3,4-cyclopentanetetracarboxylic acid, 1,2,4,5-benzenetetracarboxylic acid, 1,2,3,4-butanetetracarboxylic acid, and 1,2,3,4,5,6-cyclohexanehexacarboxylic acid.

According to present invention any alcohol known in the art containing two or more reactive hydroxyl groups can be used for the preparation of the linear or star-shaped hydroxyl-terminated prepolymer (PrePolym2), including alcohols such as, for example, 1,3-propanediol, 1,3-butanediol, 1,4-butanediol, 1,6-hexanediol, 1,7-heptanediol, 1,8-octanediol, trimethylolethane, trimethylolpropane, butanetriol, phloroglucinol, erythritol, pentaerythritol, or dipentaerythritol. Naturally occurring alcoholic compounds of sugars of mono-, di-, or trisaccharides of hexoses or pentoses, or maltitol, sorbitol, mannitol, xylitol, inositol, or such, can optionally be used.

In accordance with the above, the central functional compounds can be reacted with a hydroxycarboxylic acid yielding an end group modified telechelic hydroxycarboxylic acid prepolymer. Subsequently, this end group modified hydroxycarboxylic acid prepolymer can be linked with another end group modified hydroxycarboxylic acid prepolymer to obtain the high molar mass hyperbranched polymer. This process may, as outlined above, be carried out without the use of linking agents or solvents.

The alcohols and carboxylic acids containing two or more functional hydroxyl or carboxylic acid groups in the present invention are called initiating compounds because the compounds control the final molar mass as well as the end groups of the prepolymers PrePolym1 and PrePolym2, even though the initiation of the reactions not necessarily involve said alcohol and/or carboxylic acid compound. The initiating compound can be used singly or as a mixture with one or several other initiating compounds containing the same functional groups. When the initiating compound is present in different stereoforms, such as, for example, inositol containing nine stereoisomers, one isomer may be used individually or a mixture of isomers may be used.

It will be apparent that the functional compounds used as initiating compounds in the present invention do not have to be one of the few hydroxyl or carboxylic acid containing compounds mentioned herein as examples, but can also consist of other hydroxyl or carboxylic acid containing compounds, or compounds containing other initiating species, such as, for example, amido, amino, epoxy, cyano, nitro, sulfano, mercapto, siloxy, or phosphoro groups.

The hydroxycarboxylic acid, which can be used in present invention, is a carboxylic acid containing a hydroxyl group in the molecule including, for example, lactic acid, glycolic acid, 4-hydroxybutyric acid, and 6-hydroxycaproic acid. The hydroxycarboxylic acid can be used singly or in combination with other hydroxycarboxylic acid(s). When the hydroxycarboxylic acid is present in different stereoforms, such as, for example, lactic acid, can one isomer individually or a mixture of isomers be used.

In an attractive embodiment of the process according to the present invention, more than two prepolymers are coupled, for instance described in Example 7.

At least one of the prepolymers is preferably obtained by polycondensation of one or more amino acids, or by polycondensation of hydroxy acids, wherein said hydroxy acids are preferably selected from lactic acid, hydroxycaproic acid, hydroxy butyric acid and glycolic acid, for instance as described in Example 8.

In another preferred embodiment, at least one of the prepolymers is obtained by ring-opening polymerization from e.g. ring-like structure of dimers of hydroxycarboxylic acids, such as, for example, lactide, glycolide, or from other ring-like esters such as lactones, such as β-propiolactone, δ-valerolactone, ε-caprolactone, from bis-lactones, such as, for example, those described in U.S. Pat. No. 3,072,680, preferably cyclic esters, chosen from L,L-lactide, D,D-lactide, rac-lactide, meso-lactide and/or glycolide, ε-caprolactone; or from another ring-like ester such as, cyclic carbonates, preferably trimethylene carbonate, or from cyclic amides, preferably caprolactam.

The ring-like ester, ester-amide or amide may be used singly or in combination with other ring-like esters. When the ring-like ester is present in different stereoforms, such as, for example, lactide, can one isomer individually or a mixture of isomers be used.

No particular restriction is set in the invention upon how the ring-opening polymerization may be performed, and any process known in the art, such as, for example, polymerization in an extruder, is applicable as long as required functional terminal groups, essential for performing a dehydration condensation reaction of the prepolymers thus producing a hyperbranched polymer, are obtained. The ring-opening polymerization is preferably performed in the melt, allowing the possibility of adequate mixing during the reaction, in the presence of a suitable amount of a catalyst known in the art. Representative catalysts include inorganic and organic compounds of metals such as, for example, Sn, Zn, Fe, Al, and so forth, acids, such as, for example, triflic acid, p-toluenesulphonic acid and so forth. The amount of catalyst is not in any particular way restricted, nor when the catalyst is added, as long as the catalyst or mixture of catalysts fulfill their initial purpose of increasing the reaction rate. Typically 0.001 to 1 wt %, and more typically 0.01 to 1 wt %, catalyst based on the amount of reagents is used.

The invention further relates to hyperbranched polymers, obtainable by the process as described above; the said polymer preferably comprises biodegradable and/or hydrolysable ester groups. In a particular embodiment, the hyperbranched polymer according to the invention is a copolymer consisting of blocky, randomly distributed, alternating, or graft structures, each of these providing advantages like degradation pattern, compatibility, impact strength, etc., due to the specific structure.

Polymers prepared by the process according to the invention can be further tailored to meet the properties of the intended use by providing a mixture of one or more polymers according to the invention and one or more additives, e.g. chosen from fillers, reinforcement agents, plasticizers, stabilizers or other additives like coloring pigments, release agents, flame retardants etc, and combinations of two or more thereof.

The fillers used may be of inorganic or organic kind, such as magnesium and calcium carbonate, kaolin, tricalcium phosphate, talc, wood fiber, apple fiber, zein, gluten, and casein in any available form or shape. Natural organic fillers are preferably used in the present invention.

Reinforcing agents used may be of inorganic kind such as metal or glass whiskers, fibres, hollow-fibres, non-woven, or woven fabrics. Examples on reinforcing agents of organic origin may be fibres, non-woven or woven fabrics of natural fibres like flax, hemp, jute, ramie, cotton or any kind of man-made fibres or hollow fibres.

Suitable plasticizers, such as mono- and polycarboxylic acid esters, polymeric esters, polyalkyl ethers, glycerol esters and glycol ethers can, for example, be used alone or as blends with other plasticizing compounds.

Examples of suitable stabilisers are anti-oxidants and catalyst deactivators. Examples of additives are nucleating agents, coloring pigments, release agents, anti-static additives, printability promoters, flame retardants.

Additional components, such as medical components, conditioners, preservatives, and scavengers can also be added to the poly(hydroxycarboxylic acid), either during the polymerization or afterwards.

The invention further provides a polymeric blend comprising two or more hyperbranched polymers according to the invention, optionally in combination with an additive as defined above.

Because of the enhanced possibility of controlling the chemical composition and microstructure of the hyperbranched polymer of the present invention the physical properties of the polymer can accurately be varied within a large range. As a result, materials that are, for example, strong and rigid, soft and flexible, sticky, and so forth, may be prepared easily. The skilled person can envision a great number of applications and uses for such versatile hyperbranched polymers. No specific restriction is though set upon the application as long as said polymer adequately meets the properties required in the application. Such an application can, for instance, be in the packaging industry where a rigid material is preferred. The hyperbranched polymer may also be prepared in such a manner, for example by synthesizing a copolymer combining high-$T_g$ and low-$T_g$ polymers with blocky or randomly distributed monomer units, that it shows favorable properties in applications where, for example, adhesive, soft, and/or elastic properties are desired. Further, materials consisting of hydrophilic blocks and hydrophobic blocks, suitable for use as, for example, gels or dispersions, can be prepared by block-, or multi-block-copolymerization. Because of the high number of functional end groups may the hyperbranched poly(hydroxycarboxylic acid) also advantageously be used in medical applications, such as, for example, a biomaterial, with biologically active molecules chemically or physically bound to the polymer. A hyperbranched poly(hydroxycarboxylic acid), intended for, for example, medical applications, can additionally be prepared by using an initiating compound that has a positive effect on the specific biological environment wherein the polymer is used. Another beneficial application may also be, for example, in the use in blends with other polymeric substances.

The hyperbranched polymer according to the invention, the above-described mixture or blend can advantageously be used in films, moldings, fibres, particles, gels, dispersions or solutions for packaging materials, coatings, adhesives, chewing gums, electronic components, or, as indicated above, in medical applications. The hyperbranched polymer according to the invention, the above-described mixture or blend can also advantageously be used for modifying the impact resistance, increasing the heat distortion temperature, plasticizing, reinforcing, compatibilizing or manipulating the stability of one or more polymer formulation(s).

The invention will now be further explained by the following non-limiting examples, wherein:

EXAMPLES

The dehydration condensation reactions were performed using a laboratory rotary evaporator unit equipped with a thermostated oilbath, a vacuum-pulling unit, and an inlet for inert gas. Ring-opening polymerizations were performed under inert atmosphere in an electrically heated Brabender W 50 E mixer. Optionally ring-opening polymerizations were performed in round-bottomed glassware under inert atmosphere using a laboratory mechanical stirrer for mixing and a thermostated oilbath for heating to the desired polymerization temperature. Standard laboratory procedures were used in all chemical handling, purification, and synthesis.

The amount of monomer (hydroxycarboxylic acid or ring-like ester of hydroxycarboxylic acid) and initiating compound containing carboxylic acid groups or hydroxyl groups added were based on molar calculations for obtaining a certain molar mass of the prepolymers prepared, according to standard polymerization procedures.

A GPC (Gel Permeation Chromatography) apparatus was used for molar mass measurements. The copolymer composition was determined by NMR (Nuclear Magnetic Resonance) technique. Differential Scanning Calorimetry (DSC) was used for measuring the thermal properties. Analyses were performed according to standard procedures known in the art.

Example 1

Preparation of Prepolymers by Dehydration Condensation Reaction

To a round-bottomed flask, different hydroxycarboxylic acid(s) (see Table 1) containing free water, initiating compound containing carboxylic acid groups or hydroxyl groups, and 0.1 wt % of stannous 2-ethylhexanoate were charged and heated under stirring in a rotary evaporator unit under reduced pressure to remove the free water from the reaction mixture and oligomerize the hydroxycarboxylic acid. After the calculated free water was removed and some oligomerization had occurred, the rotary evaporator unit was cleaned with acetone, the pressure again lowered stepwise to the minimal pressure specified in Table 1, and the dehydration condensation reaction continued at 180° C. for the time specified in Table 1. After discontinuing the reaction, the polymerization products were cooled and stored under ambient conditions until analyzed and used for further linking-reactions. The conditions during the dehydration condensation reaction and prepolymer characteristics are also shown in Table 1.

TABLE 1

Reaction conditions, molar mass and its distribution for prepolymers prepared by dehydration condensation reaction.

| Exp. No. | Hydroxy-carboxylic Acid | Initiating Compound | Polym. Time (h) | Min. p (mbar) | $M_w$ (g/mol) | $M_w/M_n$ |
|---|---|---|---|---|---|---|
| 1 | L-lactic acid | 1,4-butanediol | 8 | 12 | 2500 | 1.84 |
| 2 | L-lactic acid | glycerol | 8 | 25 | 3700 | 1.66 |
| 3 | L-lactic acid | glycerol | 18 | 14 | 4600 | 1.92 |
| 4 | L-lactic acid | pentaerythritol | 8 | 14 | 2400 | 2.07 |
| 5[a] | L-lactic acid | inositol | 9 | 20 | 4700 | 2.02 |
| 6[a] | L-lactic acid | inositol | 10 | 18 | 4500 | 1.86 |
| 7 | L-lactic acid | succinic acid | 14 | 25 | 3800 | 2.18 |
| 8 | L-lactic acid | decanedioic acid | 13 | 17 | 3600 | 4.29 |
| 9 | L-lactic acid | 1,2,3,4,5,6-cyclohexane-hexa-carboxylic acid | 8 | 20 | 2000 | 2.71 |
| 10 | L-lactic acid | 1,2,3,4,5,6-cyclohexane-hexa-carboxylic acid | 21 | atm.[b] | 1000 | 2.14 |
| 11[c] | glycolic | glycerol | 5 | 30 | — | — |

TABLE 1-continued

Reaction conditions, molar mass and its distribution for prepolymers prepared by dehydration condensation reaction.

| Exp. No. | Hydroxy-carboxylic Acid | Initiating Compound | Polym. Time (h) | Min. p (mbar) | $M_w$ (g/mol) | $M_w/M_n$ |
|---|---|---|---|---|---|---|
| 12[d] | glycolic acid/ L-lactic acid | — | 10 | 30 | 1000 | 2.36 |

[a]0.2 wt % stannous 2-ethylhexanoate used in the reaction.
[b]Argon gas assist for removing formed water used in the reaction.
[c]Prepolymer not soluble in solvent used for molar mass determinations. DSC showed a $T_m$ of about 180° C.
[d]Random 54/46 (mol/mol) copolymer.

Example 2

Preparation of Prepolymers by Ring-Opening Polymerization

To a pre-heated (170° C.) reaction vessel, monomer, initiating compound, and 0.05 wt % of stannous 2-ethylhexanoate were charged under inert atmosphere. After the predetermined polymerization time the polymerization was discontinued, the polymer cooled and stored under ambient conditions before analyses and further linking-reactions. The prepolymer characteristics are shown in Table 2.

TABLE 2

Molar mass and its distribution for prepolymers prepared by ring-opening polymerization.

| Experiment No. | Monomer | Initiating Compound | $M_w$ (g/mol) | $M_w/M_n$ |
|---|---|---|---|---|
| 13[a] | ε-caprolactone | pentaerythritol | 10 300 | 1.17 |
| 14 | ε-caprolactone | pentaerythritol | 6 700 | 1.43 |
| 15 | rac-lactide | phloroglucinol | 33 800 | 1.69 |
| 16 | rac-lactide | inositol | 16 400 | 1.30 |
| 17 | rac-lactide | Dipentaerythritol | 21 600 | 1.18 |
| 18 | L,L-lactide | pentaerythritol | 31 700 | 1.45 |
| 19[b,c] | ε-caprolactone/ L,L-lactide | pentaerythritol | 10 200 | 1.24 |
| 20[c,d] | ε-caprolactone/ L,L-lactide | pentaerythritol | 10 500 | 1.41 |
| 21[d] | ε-caprolactone/ rac-lactide | pentaerythritol | 22 600 | 1.35 |

[a]Polymer obtained from Solvay Interox Ltd.
[b]Block-copolymer prepared by sequential polymerization.
[c]0.1 wt % stannous 2-ethylhexanoate used in the polymerization.
[d]Random-copolymer.

Example 3

Build-Up in Molar Mass vs. Polymerization Time

Figure 3:
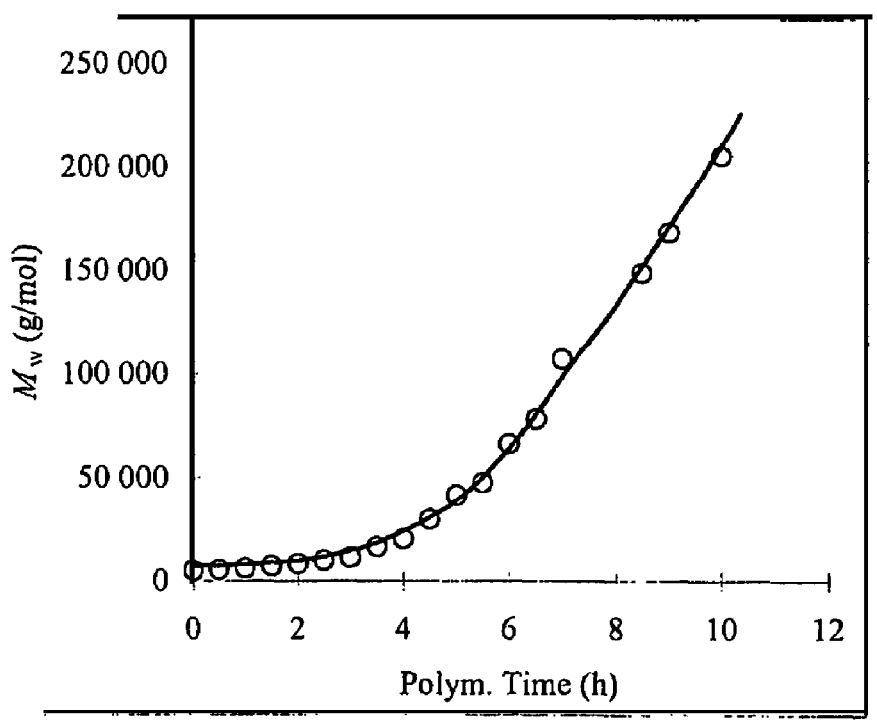
FIG. 3. shows the weight-average molar mass vs. polymerization time when reacting prepolymer from Experiment No. 5 with prepolymer from Experiment No. 10.

To a round-bottomed flask, 59.95 g of the hydroxyl-terminated prepolymer from Experiment No. 5 and 12.68 g of the carboxylic acid-terminated prepolymer from Experiment No. 10 were charged and heated at 180° C. under stirring in a rotary evaporator unit. The pressure was stepwise lowered to a minimum value of 3 mbar and the dehydration condensation reaction was monitored by the build-up of weight-average molar mass as a function of polymerization time. Within 10 h a rigid poly(hydroxycarboxylic acid) having a weight-average molar mass exceeding 200,000 g/mol was obtained. FIG. 3 shows the weight-average molar mass vs. polymerization time.

Example 4

Effect of Different Initiating Compounds

Figure 4:
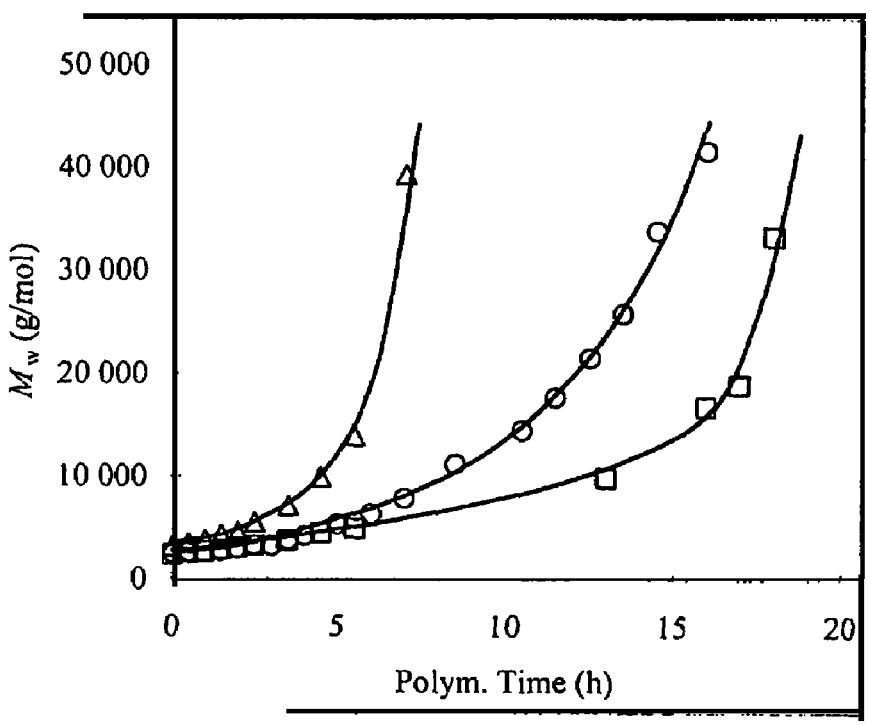
FIG. 4. shows the weight-average molar mass vs. polymerization time when reacting prepolymer from Example 1, Experiment No. 9 with different prepolymers from Example 1: Experiment No. 1 (○), Experiment No. 2 (□), and Experiment No. 4 (△).

To a round-bottomed flask, a known amount (40-50 g) of the carboxylic acid-terminated prepolymer from Experiment No. 9 and three different hydroxyl-terminated prepolymers were charged and heated at 180° C. under stirring in a rotary evaporator unit. The three different hydroxyl-terminated prepolymers that were used were:
  (a) prepolymer from Experiment No. 1,
  (b) prepolymer from Experiment No. 2, and,
  (c) prepolymer from Experiment No. 4.
The pressure was stepwise lowered to a minimum value of 30 mbar and the dehydration condensation reaction was monitored by the build-up of weight-average molar mass as a function of polymerization time. In all experiments 100 wt % hydroxyl-terminated prepolymer, based on the weight of carboxylic acid-terminated prepolymer, was used. The weight-average molar mass as a function of polymerization time when linking the carboxylic acid-terminated prepolymer with the different hydroxyl-terminated prepolymers is shown in FIG. 4 (hydroxyl-terminated prepolymers of Experiment No. 1 (○), Experiment No. 2 (□), and Experiment No. 4 (Δ)).

Example 5

Regulation of Hydroxyl End Groups in the Linking Reaction

To a round-bottomed flask, 59.95 g of the hydroxyl-terminated prepolymer from Experiment No. 6 and 12.68 g of the carboxylic acid-terminated prepolymer from Experiment No. 10 were charged and heated at 180° C. under stirring in a rotary evaporator unit. The pressure was stepwise lowered to a minimum value of 14 mbar and the dehydration condensation reaction was monitored by the content of —OH end groups, available for further chemical reactions, as a function of polymerization time (Table 3).

TABLE 3

—OH end groups in the poly(hydroxycarboxylic acid) as a function of polymerization time.

| Polymerization Time/(h) | —OH end groups/ (mol %)[a] |
|---|---|
| 0 | 6.9 |
| 2 | 6.1 |
| 4 | 5.7 |

[a]Determined by NMR technique.

Example 6

Preparation of Hyperbranched Block-Copolymer

Figure 5:
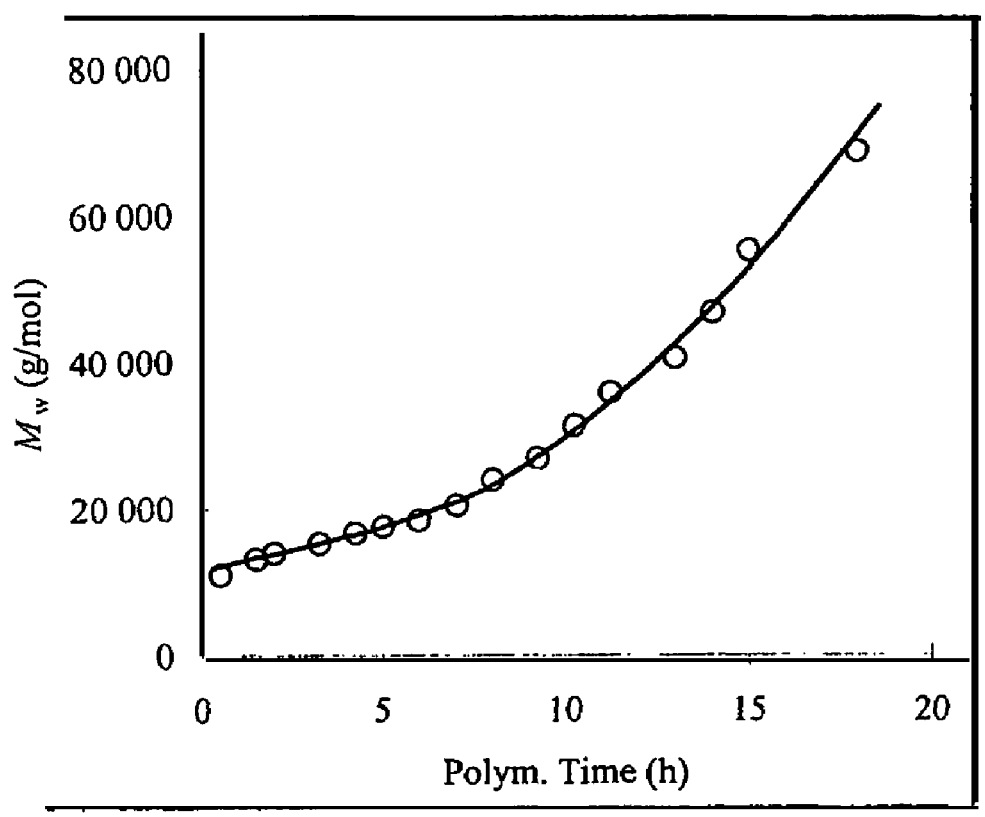
FIG. 5. shows the weight-average molar mass of the block-copolymer vs. polymerization time when reacting prepolymer from Example 1, Experiment No. 7 with prepolymer from Example 2, Experiment No. 13.

To a round-bottomed flask, 40.00 g of the hydroxyl-terminated prepolymer from Experiment No. 13 and 40.00 g of the carboxylic acid-terminated prepolymer from Experiment No. 7 were charged and heated at 180° C. under stirring in a rotary evaporator unit. The pressure was stepwise lowered to a minimum value of 20 mbar and the dehydration condensation reaction was monitored by the build-up of weight-average molar mass in the block-copolymer as a function of polymerization time (FIG. 5). Within 18 h a high-modulus block-copolymer having a weight-average molar mass of 69,000 g/mol was obtained.

Example 7

Preparation of Hyperbranched Random-Copolymer

To a round-bottomed flask, 40.00 g of the prepolymer from Experiment No. 12 and 40.00 g of the carboxylic acid-terminated prepolymer from Experiment No. 7 were charged and heated at 180° C. under stirring in a rotary evaporator unit. The pressure was stepwise lowered to a minimum value of 30 mbar and the dehydration condensation reaction was continued for 16 h. After that 10.92 g of the formed polymer was further reacted for 15 h at 20 mbar in the rotary evaporator unit with 16.38 g of hydroxyl-terminated prepolymer from Experiment No. 20, yielding a tough and flexible hyperbranched random-copolymer having a $T_g$ of 8° C. and a weight-average molar mass of 51 100 g/mol.

Example 8

Performing the Linking Reaction Partially in the Solid State

To a round-bottomed flask, 24.05 g of pulverized hydroxyl-terminated prepolymer from Experiment No. 11 and 56.18 g of the carboxylic acid-terminated prepolymer from Experiment No. 8 were charged and heated at 180° C. under stirring in a rotary evaporator unit. The pressure was stepwise lowered to a minimum-value of 20 mbar and the dehydration condensation reaction continued for 33 h, yielding a rigid block-copolymer consisting of more hydrophilic glycolyl blocks and less hydrophilic lactoyl blocks. The block-copolymer did not dissolve in the solvent used for molar mass determinations because of the glycolyl blocks. DSC showed a broad dimodal melting peak, ranging from 161 to 198° C., for a chloroform-purified sample, which can be related to melting of the different blocks in the block-copolymer.

Example 9

Preparation of Crosslinked Poly(Hydroxycarboxylic Acid)

To a round-bottomed flask, 40.00 g of the hydroxyl-terminated prepolymer from Experiment No. 4 and 40.00 g of the carboxylic acid-terminated prepolymer from Experiment No. 9 were charged and heated at 180° C. under stirring in a rotary evaporator unit. The pressure was stepwise lowered to a minimum value of 30 mbar and the dehydration condensation reaction was continued for 22 h. The crosslinked polymer obtained showed a high melt viscosity and did not dissolve in common organic solvents, such as chloroform.

The invention claimed is:

1. A process for preparing a hyperbranched polymer having a weight-average molar mass of at least 30,000, comprising coupling a first prepolymer having at least three functional end groups with a second prepolymer having at least two functional end groups by a dehydration condensation reaction between the end groups in the prepolymers.

2. The process according to claim 1, wherein the hyperbranched polymer is at least one of biodegradable and hydrolysable.

3. The process according to claim 1, wherein the hyperbranched polymer is a poly(hydroxycarboxylic acid).

4. The process according to claim 3, wherein the hyperbranched polymer is a poly(lactic acid).

5. The process according to claim 1, wherein the hyperbranched polymer has a weight-average molar mass of at least 50,000.

6. The process according to claim 1, wherein the hyperbranched polymer has a weight-average molar mass of at most 1,000,000.

7. The process according to claim 1, wherein the dehydration condensation reaction is performed in the melt or at least partly in the solid state.

8. The process according to claim 1, wherein said hyperbranched polymer is prepared without the use of organic solvent.

9. The process according to claim 1, wherein at least one of said first and said second prepolymer is a poly(hydroxycarboxylic acid) having a weight-average molar mass of at least 500.

10. The process according to claim 1, wherein at least one of said first and said second prepolymer is a poly(hydroxycarboxylic acid) having a weight-average molar mass of at most 500,000.

11. The process according to claim 1, wherein said functional end groups of at least one of said first and said second prepolymer are selected independently from functional groups able to undergo condensation reactions.

12. The process according to claim 1, wherein said functional end groups of at least one of said first and said second prepolymer are selected independently from hydroxy or carboxylic groups.

13. The process according to claim 1, wherein more than two prepolymers are coupled.

14. The process according to claim 1, wherein at least one of said prepolymers is obtained by polycondensation of one or more amino acids; or by polycondensation of hydroxylcarboxylic acids.

15. The process according to claim 14, wherein said hydroxylcarboxylic acid is selected from lactic acid and/or glycolic acid.

16. The process according to claim 1, wherein at least one of said prepolymers is obtained by ring-opening polymerization of:
one or more cyclic esters;
cyclic carbonates; and/or
cyclic amides.

17. The process according to claim 16, wherein said one or more cyclic esters are selected from L,L-lactide, D,D-lactide, rac-lactide, meso-lactide and/or glycolide, and/or ε-caprolactone.

18. The process according to claim 16, wherein said cyclic carbonate comprises trimethylene carbonate.

19. The process according to claim 16, wherein said cyclic amide comprises caprolactam.

20. The process according to claim 1, wherein at least one of said prepolymers is obtained by reaction of at least one of monomers and oligomers of the same with at least one of terminal hydroxy, carboxylic, cyano, amide, epoxy, and anhydride groups.

21. The process according to claim 1, further comprising at least one of a cross-linking step and an end-group modification step.

* * * * *